United States Patent [19]

Scata' et al.

[11] 4,315,835

[45] * Feb. 16, 1982

[54] COMPONENTS OF CATALYSTS FOR POLYMERIZING ALPHA-OLEFINS AND THE CATALYSTS FORMED FROM THE COMPONENTS

[75] Inventors: Umberto Scata'; Luciano Luciani; Pier C. Barbe', all of Ferrara, Italy

[73] Assignee: Montedison S.p.A., Milan, Italy

[*] Notice: The portion of the term of this patent subsequent to Sep. 2, 1997, has been disclaimed.

[21] Appl. No.: 147,521

[22] Filed: May 7, 1980

Related U.S. Application Data

[63] Continuation of Ser. No. 909,047, May 24, 1978, Pat. No. 4,220,554.

[30] Foreign Application Priority Data

May 25, 1977 [IT] Italy ............................. 23984 A/77
Jul. 4, 1977 [IT] Italy ............................. 25344 A/77

[51] Int. Cl.³ .............................................. C08F 4/64
[52] U.S. Cl. ........................... 252/429 B; 252/429 C; 252/441; 526/125
[58] Field of Search ............... 252/429 B, 429 C, 441, 252/429 R

[56] References Cited

U.S. PATENT DOCUMENTS 4,220,554 9/1980 Scata et al. ................. 252/429 C X Primary Examiner—Patrick Garvin

[57] ABSTRACT

New components of catalysts for polymerizing alpha-olefins, and the catalysts formed from the new components are disclosed. Said catalyst components are prepared by reacting Ti compounds with a carrier in the form of spheroidal particles of specified characteristics and which consists of or comprises an Mg compound, or mixture of Mg compounds of the formula $$X_n Mg(OR)_{2-n} \qquad (I)$$

in which $0 \leq n \leq 2$, R is an alkyl, aryl, cycloalkyl radical containing from 1 to 20 carbon atoms, X is halogen or a group OR' in which R' is an alkyl, aryl or cycloalkyl radical containing from 1 to 20 carbon atoms and is the same or different from R in formula (I).

11 Claims, No Drawings

COMPONENTS OF CATALYSTS FOR POLYMERIZING ALPHA-OLEFINS AND THE CATALYSTS FORMED FROM THE COMPONENTS

This is a Continuation of application Ser. No. 909,047 filed May 24, 1978 and now U.S. Pat. No. 4,220,554.

THE PRIOR ART

Polymerization catalysts which exhibit high activity and high stereospecificity in the stereoregular polymerization of alpha-olefins are known. Essential components for the preparation of said catalysts are an alkyl Al compound partially complexed with an electron-donor compound, and a halogenated Ti compound, preferably in the form of a complex with an electron-donor compound, supported on a Mg dihalide. Some examples of these catalysts are described in British Pat. No. 1,387,890.

The known highly stereospecific and highly active catalysts do not result in polymers having a controlled morphology, and in particular polymers in the form of free-flowing particles having a narrow size distribution. Generally, the polymers prepared by means of said known catalysts exhibit a rather broadened distribution curve and are not free-flowing. Most of the particles of the polymers so obtained have sizes comprised between 1000 and 100$\mu$. Also present in said polymers are significant fractions having dimensions above 1000$\mu$ and below 100$\mu$.

U.S. Pat. No. 3,953,414 describes polymerization catalysts use of which results in olefin polymers in the form of spheroidal particles having a controlled particle size distribution. The activity and stereospecificity of such catalysts, however, is not sufficiently high for commercial practice.

THE PRESENT INVENTION

Since there is a definite need in the art for catalysts which are both highly active and highly stereospecific in the polymerization of alpha-olefins and which result in the production of polymers of the alpha-olefins in the form of free-flowing particles having a narrow size distribution, it is one object of this invention to provide a process for satisfying such need in the art.

This and other objects are accomplished by the invention which provides new catalyst-forming components obtained by reacting a Ti compound with a carrier(s) in the form of spheroidal particles having a mean diameter of from 1 to 100$\mu$, a surface area larger than 100 m$^2$/g and, in particular, comprised between 200 and 700 m$^2$/g, a porosity lower than 0.25 cc/g, and consisting of or comprising an Mg compound, or mixture of Mg compounds of the formula:

$X_nMg(OR)_{2-n}$ where $0 \leq n \leq 2$; R is an alkyl, aryl or cycloalkyl radical containing from 1 to 20 carbon atoms; X is a halogen atom or a group OR' in which R', either the same or different from R, is an alkyl, aryl or cycloalkyl radical containing from 1 to 20 carbon atoms.

Among the catalyst components of this invention, those most effective in polymerizing alpha-olefins stereospecifically are prepared by reaction between (a) a Ti compound, (b) a carrier(s) as defined herein, and (c) an electron-donor compound, or Lewis base, capable of forming addition compounds with the Ti compound.

Catalyst components particularly suitable for providing catalysts for the stereospecific polymerization of the alpha-olefins comprise the product prepared from (a) a Ti compound selected from the halogenated compounds containing at least a Ti-halogen linkage especially those of tetravalent Ti, (b) a carrier(s), comprising compounds of formula:

$X_nMg(OR)_{2-n}$ in which $0 \leq n \leq 2$, and particularly $0 \leq n \leq 1$, X is a halogen atom selected from Cl and Br, and R is an alkyl, cycloalkyl or aryl radical containing from 1 to 12 carbon atoms, the surface area and the porosity of the carrier being comprised between 200 and 700 m$^2$/g and between 0.1 and 0.2 cc/g, respectively, and at least 80% of the particles having a size ranging from 5 to 25$\mu$, more particularly from 8 to 20$\mu$, and (c) an electron-donor compound preferably selected from the group consisting of esters of organic and inorganic oxygenated acids, in particular from the group consisting of esters of aromatic acids.

Halogenated Ti compounds particularly suitable for preparing the catalytic components of this invention are the Ti tetrahalides, in particular TiCl$_4$. However, halogen-alcoholates and halogen-phenolates, such as Ti(O-n-C$_4$H$_9$)$_2$Cl$_2$, TiOC$_2$H$_5$Cl$_3$, Ti(OC$_6$H$_5$)$_2$Cl$_2$, can be used. Some examples of the non-halogenated Ti compounds which can be used include the tetra-alcoholates, such as Ti(O-n-C$_4$H$_9$)$_4$. In general, the non-halogenated Ti compounds are used for preparing catalysts for the polymerization of ethylene.

The compounds of formula $X_nMg(OR)_{2-n}$ containing at least a Mg—OR bond, are represented by magnesium dialcoholates and magnesium monohalogenalcoholates. Examples of such compounds include Mg(OC$_2$H$_5$)$_2$, Mg(O-i-C$_4$H$_9$)$_2$, Mg(OC$_6$H$_5$)$_2$, Mg(OC$_6$H$_4$CH$_3$)$_2$, Mg(OC$_6$H$_4$C$_2$H$_5$)$_2$, Mg(OCH$_3$)(OCH$_2$C$_6$H$_5$), C$_2$H$_5$OMgCl, C$_4$H$_9$OMgCl, CH$_3$C$_6$H$_4$O-MgCl and (CH$_3$)$_2$C$_6$H$_3$OMgCl.

The Mg alcoholates can be employed, also, in the form of complexes with alcoholates of other metals, such as alcoholates of Al, B, Zn, Zr.

The carrier(s) may contain, besides the above-cited Mg compounds, organic or inorganic solid co-supports which are inert with respect to the Mg compounds, selected in particular from among the compounds of the metals of groups III and IV of the Mendelyeev Periodic Table, such as, for instance, SiO$_2$, Al$_2$O$_3$, B$_2$O$_3$, ZrO$_2$, TiO$_2$; or from among those of the metals of groups I and II, such as, for example, Na$_2$CO$_3$, NaCl, Na$_2$SO$_4$, MgO, MgCO$_3$, Mg(OH)Cl, CaCl$_2$.

Compounds $X_nMg(OR)_{2-n}$, wherein n is 2, are represented by the Mg dihalides, in particular by MgCl$_2$.

Carrier(s) are generally characterized, besides the characteristics of surface area and porosity indicated hereinabove, also by a resistance to ultrasonic vibrations higher than 3 Watt h/l, and in particular higher than 30 and comprised between 30 and 70 Watt h/l. The definition of the resistance to ultrasonic vibrations and the determination of the resistance is in accordance with U.S. Pat. No. 3,953,414.

Electron-donor compounds (c) useful in the practice of this invention and different from the already indicated esters of the oxygenated acids, include ketones, aldehydes, ethers, amides, P-compounds such as phosphines and phosphoramides. The preferred compounds are the alkyl esters of the aromatic acids. Some typical examples of said esters are the alkyl benzoates, alkyl toluates and alkyl anisates. Ethyl benzoate, methyl toluate and methyl anisate are representative compounds. The esters can be used also in the form of adducts with Lewis acid halides different from the Mg halides. The Al and Sn halides and in particular $AlCl_3$ are examples of the Lewis acid halides.

The aromatic esters can be prepared in situ by an exchange reaction between OR groups of carrier(s) containing compounds $X_nMg(OR)_{2-n}$, wherein n is lower than 2, in particular n=1, and atoms of halogen of a halide of an aromatic acid. Benzoyl chloride, for example, can be employed.

The stereospecificity of the catalysts formed from the new catalyst-forming components of the invention can be improved by the aromatic ester admixed with minor amounts of a phenol, in particular an ortho-substituted phenol. Preferably, the electron-donor compound (c) is reacted with carrier(s) prior to the reaction with the Ti compound. It is possible, however, to react both the Ti compound and carrier(s) and the electron-donor compound simultaneously. It is also possible to react the Ti compound with carrier(s) and then treat the solid product of the reaction with the electron-donor compound. The Ti compound can be also reacted in the form of an addition compound with the electron-donor compound.

The reaction of (a), (b) and (c) is conducted under conditions such that the amount of electron-donor compound present in combined form in the solid product separated from the reaction mixture is lower than 1 mole per gram atom of Mg, and in particular is comprised between 0.1 and 0.3 moles per gram atom of Mg.

The molar ratio between the electron-donor compound and the Ti compound ranges from 0.2 to 2, preferably from 0.5 to 1.5.

For the purpose of increasing the activity and stereospecificity of the catalyst prepared from the catalyst-forming components of this invention, it is important that less than 50% by weight of the tetravalent Ti compounds contained in the catalytic component are extractable with $TiCl_4$ at 80° C. Preferably, the extractable Ti compounds are less than 20% by weight.

The reaction between the compounds including Mg—OR bonds of carrier(s) and the halogenated Ti compound leads to a Mg dihalide containing a Ti compound chemically fixed on it. The reaction is carried out under conditions such that the conversion is as complete as possible.

The reaction between carrier(s), a halogenated Ti compound, such as $TiCl_4$, and an electron-donor compound (c) leads to a Mg dihalide comprising a Ti compound and an electron-donor compound chemically fixed on the Mg halide. The fact that the Ti compound and the electron-donor compound are chemically bound to the Mg dihalide is evidenced by various investigations, including infrared and Raman analysis and extraction with solvents.

It has been found, and this is another aspect of the present invention, that the product of the reaction between the Ti compound and carrier(s), whether containing an electron-donor compound (c), or not, retains the morphology of carrier(s) and a surface area comprised between 90 and 700 m²/g. The porosity is somewhat higher and comprised between 0.2 and 0.3 cc/g.

Analogously, and this is a still further feature of our invention, it is possible to obtain products retaining the morphology and characteristics of the starting carrier(s) if, prior to reaction with the Ti compound, carrier(s) containing at least a Mg compound with a Mg—OR bond is reacted with a halogenating agent capable of substituting OR groups of the carrier with halogen atoms. Examples of such halogenating agents include halogenated Si compounds as, for instance $SiCl_4$, benzoyl chloride, $AlCl_3$, Al-alkylmonohalides or Al-alkyldihalides, $BCl_3$, $PCl_3$. The compound obtained is a Mg dihalide. In particular, Mg dichloride is formed when both the halogenating agent and carrier(s) contain chlorine atoms. The halogenating compound is used in such an amount that the molar ratio between OR groups of compound $XnMg(OR)_{2-n}$ and the active halogen atoms of the halogenating agent is lower than 1.

An example of reactions leading to the formation of Mg dichloride that retains the morphological characteristics, including the surface area and the porosity of the starting carrier, is the reaction of $ClMgOC_2H_5$ with $SiCl_4$, $AlCl_3$ and similar halogenating compounds.

As explained in more detail infra, compounds $X_nMg(RO)_{2-n}$, in which n is <2, in particular is equal to 1, can be decomposed in situ to a Mg dihalide by effecting the reaction resulting in the compound $X_nMg(OR)_{2-n}$ in the presence of a halogenating substance, i.e., a substance capable of forming Mg-halogen bonds.

In both the case of the final catalytic component (after reaction with the Ti compound) and the case of the product resulting from the treatment with the halogenating substance, the particle size distribution is in a narrow range of values. Generally at least 80% of the particles have sizes ranging from 5 to $25\mu$, in particular from 8 to $20\mu$.

When the halogenating substance is a hydrogen halide, e.g., anhydrous gaseous HCl, the resulting product is an adduct between the Mg dihalide and the alcohol or phenol that is formed during the reaction. In the case of components for use in preparing catalysts for the stereospecific polymerization of alpha-olefins, the adduct, before the reaction with the halogenated Ti compound, can be treated with a compound capable of reacting and removing the alcohol or phenol from the adduct, for instance with an Al-trialkyl, $SiCl_4$, $AlCl_3$ or benzoyl chloride.

However, it is also possible, and this is a presently preferred embodiment of the invention, to cause the adducts to directly react with the Ti compound in the presence of an electron-donor compound free from active hydrogen, or to introduce the electron-donor compound in a combined form with the adduct itself, provided that the amount of electron-donor compound that remains fixed on the catalyst component after extraction thereof with $TiCl_4$ at 80° C. for 2 hours is of at least 0.5 and up to 3 moles/gram atom of Ti. It is, furthermore, important in the practice of this invention, that the catalyst component contains less than 50%, preferably less than 20%, of Ti compounds extractable with $TiCl_4$ at 80° C.

By pre-treating the carrier(s) with a hydrogen halide it is possible to obtain catalyst components which, besides retaining the morphological properties of the starting carrier, have a higher content of Ti compounds which are non-extractable with $TiCl_4$ at 80° C. This is an advantage, because it permits lowering of the halogen/Ti ratio of the catalyst and the obtaining, in consequence, of polymers having a lower halogen content, the catalytic activity being the same.

Prior to the reaction with the halogenating substance, carrier(s) can be treated with an electron-donor compound (c). In the alternative, the electron-donor compound can be present during the alogenation reaction or it can be reacted at the conclusion of such reaction.

The adducts of the compounds of formula $X_nMg(OR)_{2-n}$ can be prepared by various methods. A presently preferred method consists in reacting an anhydrous hydrogen halide or mixture thereof with an alcohol or phenol with compounds of the formula $X_nMg(OR)_{2-n}$, in which $0 \leq n < 2$ and X and R have the same meanings as in formula (I), already formed or during the preparation of same.

The reaction is generally carried out in suspension in an inert hydrocarbon medium (hexane, heptane, etc.,) at a temperature ranging from the room temperature, or even lower, to the boiling point of the hydrocarbon solvent. The reaction with anhydrous hydrogen halide is preferably carried out at temperatures lower than room temperature, for example at 0° C. Preferably 1 mole of anhydrous hydrogen halide is used for each OR group of the $X_nMg(OR)_{2-n}$ compound.

The reaction of the Ti compound with the adduct of the Mg dihalide with the alcohol or phenol can be effected in the presence of the electron-donor compound, or the latter can be pre-reacted with the adduct or introduced into such adduct during the formation thereof, or it can be reacted with compound $X_nMg(OR)_{2-n}$ prior to its being transformed into the adduct. The amount of electron-donor compound present in a combined form in the adduct is generally comprised between 0.05 and 1 mole per mole of alcohol or phenol in the adduct.

The reaction between the Ti compound and carrier(s) or the adduct thereof with an alcohol or a phenol is conducted by suspending the carrier in a liquid reaction medium which may consist of said liquid Ti compound or of a solution thereof in an inert hydrocarbon diluent. The reaction is preferably conducted using the liquid Ti compound as reaction medium.

The temperature is generally combrised between room temperature and 150° C. In the case of TiCl$_4$, the reaction can be carried out at the boiling temperature of the TiCl$_4$ or at lower temperatures, for example, between 80° and 120° C. In general, it is preferable to operate between 110° C. and 135° C.

The solid reaction product is separated from the liquid medium or from the excess of Ti compounds, at temperatures at which the undesired Ti compounds extractable with TiCl$_4$ at 80° C. remain dissolved in the reaction medium and are removed together with it.

When TiCl$_4$ is employed as reaction medium, separation of the solid is carried out at temperatures generally exceeding 80° C. It is also possible, however, to operate at lower temperatures, provided TiCl$_4$ amounts sufficient to dissolve the undesired Ti compounds are used. It is also convenient to repeat the treatment with TiCl$_4$ one or several times.

The solid is separated from the reaction mixture and washed with an inert hydrocarbon diluent (hexane, heptane, etc.) to remove the last traces of the unreacted Ti compound.

The reaction between electron-donor compound (c) and carrier(s) (in case compound (c) is reacted with the carrier before the reaction with Ti compounds) is generally carried out by suspending the carrier in a hydrocarbon solution containing the electron-donor and by conducting the reaction at temperatures ranging from room temperature to 100° C., preferably from 40° to 80° C.

The solid reaction product separated from the liquid phase is first washed with a hydrocarbon diluent and then reacted with the Ti compound.

The reaction between carrier(s) and halogenating agents is also effected by suspending the carrier in a liquid medium consisting of said halogenating agent or of a solution thereof, and by conducting the reaction at temperatures generally ranging from room temperature to 150° C.

The solid product is separated from the reaction mixture, washed and then reacted with the electron-donor compound and/or with the Ti compound.

As already explained herein, the electron-donor compound may be added, also, during the halogenation reaction.

The preparation of compounds $X_nMg(OR)_{2-n}$, in which n is $<2$ and that may coincide, in practice, with the preparation of the carrier(s), can be effected by an exchange reaction of an organometallic Mg compound of formula $X_nMgR_{2-n}$, wherein $0 \leq n < 2$, R is an alkyl, aryl or cycloalkyl radical having 1 to 20 carbon atoms and X is a halogen or an alkyl, aryl or cycloalkyl radical having 1 to 20 G, either like or unlike R, with an ester of orthosilicic acid.

Organometallic compound $X_nMgR_{2-n}$ may be preformed or may be formed in the nascent state by reaction between Mg metal and an organic halide RX, in which X is a halogen and R is a hydrocarbon radical having the meaning specified above.

During the exchange reaction, at least one radical R of organometallic compound $X_nMgR_{2-n}$ is transferred to the ester of orthosilicic acid, and at least one group OR of such ester is linked to the magnesium atom.

Results similar to those obtained with the orthosilicic acid esters can be achieved with the esters of other oxygenated inorganic acids including, for instance, alkyl borates, alkyl carbonates and phosphates.

The preferred method consists in reacting, in a single step, Mg metal, the organic halide and the orthosilicic acid ester.

RX compounds in which X is a halogen, preferably Cl or Br, R is an alkyl, alkenyl, aryl or cycloalkyl radical having 1 to 20 C, preferably 1 to 8 C, are employed as organic halides. Such compounds are, for example, methyl, ethyl, n-butyl, n-amyl, n-octyl, t-butyl, isobutyl and cyclohexyl chlorides and bromides, chlorobenzene, o-chlorotoluene, 2-chloroethylbenzene, vinyl chloride and benzyl chloride.

The silicic acid esters have the formula $$X_mSi(OR)_{4-m}$$

wherein R has the meaning specified above for the XR compounds, X is halogen or an alkyl, aryl or cycloalkyl radical containing 1 to 20 C and m is a number from 0 to 3.

The presently preferred Si compound is ethyl silicate Si(OC$_2$H$_5$)$_4$. Specific examples of other useful Si compounds are: Si(OCH$_3$)$_4$, CH$_3$Si(OCH$_3$)$_3$, (CH$_3$)$_2$Si(OCH$_3$)$_2$, Si(OnC$_4$H$_9$)$_4$, and Si(OC$_6$H$_5$)$_4$.

The Si compound is generally employed in an amount such that the ratio between OR groups and gram atoms of Mg is equal to or higher than 1 preferably comprised between 3:1 to 5:1. In a presently preferred embodiment, 1 to 2 moles of organic halide per gram atom of Mg are used.

The reaction is carried out at temperatures ranging from 50° to 250° C., preferably from 60° to 100° C. The order in which the reagents are added is not critical. However, it is preferable to add magnesium and organic halide to the Si compound either liquid or in solution.

The preferred reaction medium is the Si compound itself or a mixture thereof with the organic halide. The reaction may be carried out, also, in the presence of an inert diluent such as, for example, an aliphatic, cycloaliphatic or aromatic hydrocarbon (hexane, heptane, benzene, toluene, etc.).

Iodine, alkyl iodides, or inorganic halides such as $CaCl_2$, CuCl, AgCl, and $MnCl_2$, may be used as reaction promoters. Magnesium is employed in the form of powder or chips.

According to another method, the Si compound can be reacted with a Grignard reagent of formula RMgX, or with a compound $MgR_2$, where R is an alkyl, aryl or cycloalkyl radical having 1 to 20 C and X is halogen. Some Grignard reagents are, for example, $ClMg$-n-$C_4H_9$; $ClMg$-i-$C_4H_9$; $ClMgC_5H_{11}$; $C_6H_5MgCl$; $C_6H_5CH_2MgCl$ and $CH_2=CHMgCl$.

Grignard reagents and compounds $MgR_2$ are prepared according to conventional methods. It is possible to utilize Grignard reagents prepared either with ethers or in a polar solvent, such as a hydrocarbon. For instance, Grignard reagents prepared in hydrocarbons/ethers mixtures, such as, e.g., a toluene/n-butyl ether mixture, may be employed.

The conditions of the reaction between silicic acid ester and Mg organometallic compound are the same as indicated for the simultaneous reaction among Mg, RX and organic silicate.

Examples of conventional preparation methods leading to the formation of compounds XMgOR, in which S is a halogen, and that can be utilized for preparing the components according to this invention, are described in U.S. Pat. Nos. 2,380,057; 2,442,053 and in British Pat. No. 591,440.

Al already explained, both the reaction in one step among Mg, RX and silicate, and the reaction between silicate and compound $X_nMgR_{2-n}$ can be conducted in the presence of a halogenating compound. In such case, the final reaction product consists essentially of a Mg dihalide, in the form of spheroidal particles exhibiting the morphological, area and porosity characteristics already specified.

If a hydrogen halide is employed as halogenating agent, the final reaction product is an adduct between the Mg dihalide and the alcohol that is formed during the reaction.

The catalytic components of the present invention form, by reaction with co-catalysts which are organometallic compounds of metals belonging to groups II and III of the Periodic Table, catalysts particularly active in the polymerization of olefins. The polymers obtained therefrom are in the form of free-flowing particles with a flow index of less than 25 seconds and particularly comprised between 12 and 20 seconds (index measured according to ASTM 1895-69 Method A).

In particular, when the catalytic component contains an electron-donor and when an Al organometallic compound partially complexed with an electron-donor is employed as cocatalyst, it is possible to obtain catalysts for polymerizing alpha-olefins which exhibit a high activity and stereospecificity and furthermore, provide polymers, such as polypropylene, in the form of free-flowing particles having a narrow particles size distribution.

The electron-donor compounds suitable for being complexed with the Al organometallic compounds belong to the same classes as electron-donor compounds (c) previously described herein.

The amount of electron-donor compound is preferably such that at least 10%, and more specifically 20–80%, of the Al organometallic compound is in the form of a complex with the electron-donor. The alkyl esters of the aromatic acids such as, for example, the esters of benzoic or toluic acid and the like are preferably employed.

Al-trialkyls, such as, e.g., Al-triethyl, Al-triisobutyl, etc., are preferably employed as Al compounds. Further examples of useful Al-alkyl compounds are described in British Pat. No. 1,387,890. Al-trialkyls are employable also in admixture with Al-dialkyl halides.

The Al/Ti ratio in the catalysts suitable for stereospecifically polymerizing alpha-olefins is generally comprised between 10 and 1000. Al/Ti ratios lower than 10 can be used provided that no electron-donor compound is used or is used in an amount less than 20% by moles with respect to the Al-alkyl compound.

The conditions for the polymerization of olefins and of the alpha-olefins with the catalysts according to this invention are conventional as known in the art.

The polymerization may be conducted in a liquid phase either in the presence or absence of an inert hydrocarbon solvent (hexane, haptane, etc.) or in a gas phase.

The polymerization temperature is generally comprised between 40° and 150° C., in particular between 50° and 90° C.

The alpha-olefins have the formula $CH_2=CHR$ in which R is an alkyl radical containing from 1 to 6 carbon atoms.

The stereospecific catalysts of the invention are particularly useful for the polymerization of propylene or mixtures thereof with minor amounts of ethylene.

The polymers obtained by using the catalysts of this invention are characterized by a high flow index (generally comprised between 12 and 20 sec.) and by a very narrow granulometric distribution. The flow index is determined according to ASTM 1895-69/A. In general, more than 50% of the particles exhibits sizes ranging from 100 to 500$\mu$. The percentage of particles having mean sizes below 50$\mu$ and above 100$\mu$ is negligible.

The following examples are given to illustrate the present invention in more detail and are not intended to be limiting.

EXAMPLE 1

(a) Preparation of the catalyst component 12.2 g of Mg metal in 35–50 mesh flakes were washed with 250 ml of n-hexane at 68° C. for 1 hour in a 1000 ml flask and then dried in anhydrous nitrogen. 104.5 g of tetraethyl orthosilicate were successively charged, bringing the suspension to 65° C., and 0.2 ml of a solution of 2 g of iodine in 10 ml of methyl iodide were introduced as a promoter, a solution consisting of 50.9 g of n-butyl chloride in 100 ml of n-hexane being then introduced dropwise in 45 minutes. The temperature was kept at 70° C. by removing the heat evolved by the reaction. The reaction was then continued at 70° C. for 6 hours. Washings with n-hexane at 50° C. were carried out by decantation, employing an amount of 200 ml of n-hexane each time, for 6 consecutive times. The resulting solid product was dried at 50° C. under vacuum. 60 g of a solid product were recovered, the elemental analysis of which gave the following results (the percentages are by weight): Mg=18.65%; Cl=27.05%. The surface area (determined according to method B.E.T.-SORPTOMATIC 1860 apparatus-C. ERBA) was 550 m²/g, the porosity 0.156 ml/g.

13.1 g of the dry product obtained were suspended in a solution containing 4.67 g of benzoyl chloride (33.3 m-moles) in 200 ml of anhydrous n-hexane, and were reacted 2 hours at 60° C. The solid obtained after filtering at room temperature was washed with n-hexane twice, employing 200 ml of n-hexane each time.

The resulting solid product was treated with 110 ml of $TiCl_4$ at 120° C. for 2 hours. After this time-period, $TiCl_4$ was removed by filtration at 120° C. and the solid was then washed with n-hexane at 65° C. until the chlorine ion disappeared. Analysis: Ti=1.85%; Mg=20.7%; Cl=70% (by weight).

(b) Polymerization of propylene 5.05 m-moles of a mixture of Al-butyls (54.4 moles % of Al-i-$Bu_3$ and 45.5 moles % of Al-n-$Bu_3$) were reacted, at room temperature, with 1.69 m-moles (254 mg) of methyl p-toluate in 80 ml of anhydrous n-heptane for 5 minutes. 30 ml of this solution, diluted with 50 ml of anhydrous n-hexane, were contacted with an amount of the catalytic component prepared as described in (a) equal to 79 mg (equivalent to 1.43 mg of Ti), for a time period of 5 minutes. This suspension was introduced, in nitrogen atmosphere, into a stainless steel autoclave having a total volume of 2.5 l, equipped with a screw magnetic stirrer and a thermocouple, and containing 870 ml of n-hexane saturated with propylene at 40° C. Successively, the remaining 50 ml of the solution of Al-butyls and methyl p-toluate were introduced in a propylene flow. After closing the autoclave, 300 Ncc of hydrogen were introduced, the temperature was brought to 60° C. and, simultaneously, propylene was introduced up to a total pressure of 9 atmospheres. During the polymerization the pressure was kept constant by continuous feeding of the monomer.

After 4 hours, the polymerization was stopped by quick cooling and degassing of the polymeric slurry. The polymer was separated from the solvent by stripping with steam and was dried in a hot nitrogen flow at 70° C. 427 g of dry polymer in flakes were thus obtained. The yield was equal to 292,000 g of polypropylene/g of Ti, and the residue of the extraction with boiling n-heptane (isotactic polypropylene) was 90% by weight. The polypropylene obtained was characterized by the following properties:
intrinsic viscosity: 1.6 dl/g
melt-flow index: 4.4 g/10 min.

| Particle size distribution of the polymer (Method ASTM D 1921-63): | | |
|---|---|---|
| Screen | (micron) | % (by weight) |
| above 2000 | " | 0.2 |
| above 1000 | " | 1. |
| above 500 | " | 5.2 |
| above 177 | " | 80.6 |
| above 105 | " | 7.8 |
| above 55 | " | 4. |
| below 55 | " | 0.8 |

The apparent (mean) density of the polymer was 0.485 kg/l (Method DIN 53194) with a flow index of 16 seconds (ASTM 1895-69/Method A).

EXAMPLE 2

(a) Preparation of the catalyst component 13.1 g of the dry product obtained by reacting Mg, Si(OEt)$_4$ and n-BuCl with one another according to Example 1(a) were suspended in a solution containing 3 g of ethyl benzoate (20 m-moles) in 200 ml of anhydrous n-hexane, and reacted for 2 hours at 60° C. The reaction was carried out according to Example 1(a).

The dry product obtained after two treatments with $TiCl_4$ was subjected to analysis, and the following results were obtained: Ti=2%; Mg=18.65%; Cl=62.40%; surface area=345 m²/g; porosity=0.291 ml/g.

(b) Polymerization of propylene in n-hexane solvent

Proceeding according to Example 1(b), 71 mg of the catalytic component (1.42 mg of Ti) prepared as described in 2(a) were introduced. At the conclusion of the polymerization, 493 g of dry polymer in flakes were obtained, with a yield of 347,000 g of polypropylene/g of Ti and a residue of the extraction with boiling n-heptane of 91% by weight.

The polymer was characterized by the following properties:
intrinsic viscosity: 1.8 dl/g
melt-flow index: 2.9 g/10 min.

| Particle size distribution of the polymer: | |
|---|---|
| (micron) | (% by weight) |
| over 2000 | 0.1 |
| over 1000 | 0.6 |
| over 500 | 1. |
| over 177 | 89.1 |
| over 105 | 5.5 |
| over 53 | 2.7 |
| below 53 | 0.8 |

The apparent density was 0.505 kg/l and the flow index of 15 seconds.

EXAMPLE 3

(a) Preparation of the catalytic component 53.5 g of Mg metal (2.2 gram atoms) and a solution consisting of 224 g of n-BuCl (2.42 moles) and of 459 g of Si(OEt)$_4$ diluted in 400 ml of hexane were employed.

Unlike what is described in Example 1(a), the solution containing n-BuCl and Si(OEt)$_4$ was added to magnesium, pre-activated in the presence of an iodine crystal, in a total time of 45 minutes, at a temperature of 70° C. The temperature was kept at 70° C. for a further 6 hours. After washings with hexane at 50° C. and drying at 50° C. under vacuum, 264 g of a solid product having the following centesimal composition were obtained: Mg=16.7% Cl=33.9%; Si=0.55%. The surface area was 450 m²/g; the porosity was 0.157 ml/g.

12.35 g of the obtained dry product were reacted with 4.67 g of benzoyl chloride (33.3 m-moles) and with 200 ml of $TiCl_4$ at 130° C. for 2 hours. After hot filtering, an analogous treatment with $TiCl_4$ was carried out. It was hot-filtered again and washings with hot hexane were effected until disappearance of the chlorine ion in the filtrate. The resulting product was dried at 40° C. The elemental analysis of the dry product gave the following results: Ti=1.4%; Mg=20.65%; Cl=70.65%. The surface area was 385 m²/g; the porosity was 0.280 ml/g.

(b) Polymerization of propylene 78 mg of the catalytic component prepared as described in 3(a) under the same polymerization conditions as illustrated in Example 1(b) were used. 360 g of polymer in flakes, with a yield of 330,000 g of polypropylene/g of Ti, having a residue of the extraction with boiling heptane equal to 89.5% by weight were obtained. The polymer was characterized by the following properties:

intrinsic viscosity: 1.9 dl/g
melt-flow index: 2.3 g/10 minutes.

| Particle size distribution of the polymer: | |
|---|---|
| micron | % by weight |
| over 2000 | 1.4 |
| over 1000 | 10. |
| over 500 | 17.2 |
| over 177 | 34.6 |
| over 105 | 27.4 |
| over 53 | 8. |
| below 53 | 0.9 |

The apparent (mean) density was 0.50 kg/l; the flow index was equal to 18 seconds.

EXAMPLE 4

(a) Preparation of the catalyst component 12.2 g of Mg metal (0.5 gram atoms) along with 104.5 g of tetraethyl orthosilicate (0.5 mole) and 150 mg of CuCl, acting as a promoter, were brought to 130° C. 0.2 ml of a solution of 2 g of iodine in 10 ml of $CH_3I$ were introduced, whereupon 84.5 g (0.75 mole) of chlorobenzene were added dropwise in a total time of 2 hours. The inside temperature rose to 160° C. At the conclusion of such operation, the reaction was carried out for 5 hours at a temperature of 160° C. The solid product obtained was washed three times at 50° C. with toluene, employing 300 ml thereof each time, and then 4 times with 200 ml of hexane each time. The solid so separated was dried at 50° C. under vacuum. 50.7 g of a dry product were thus recovered. Its centesimal composition was as follows: Mg=21.95%; Cl=29.95%; Si=0.6%.

11.1 g of the solid dry product were reacted with 4.67 g of benzoyl chloride (33.3 m-moles) and with 110 ml of $TiCl_4$ for 2 hours at 130° C. It was hot filtered, and washings with hexane at 65° C. were effected until disappearance of the chlorine ion in the filtrate. The solid product dried at 40° C. under vacuum exhibited the following centesimal composition: Ti=1.25%; Mg=18.8%; Cl=62.9%; Si=0.22%. The surface area was 94 m²/g and the porosity 0.24 ml/g.

(b) Polymerization of propylene 70 mg of the dry product prepared as described in part (a) of this example were utilized to polymerize propylene under the same conditions as in Example 1(b). 217 g of a polymer in flakes with a yield of 248,000 g of polypropylene/g of Ti, and a residue of the extraction with boiling heptane equal to 90% by weight, were obtained.

The polymer exhibited, also, the following properties:

intrinsic viscosity: 1.7 dl/g
melt-flow index: 9.3 g/10 min.

EXAMPLE 5

(a) Preparation of the catalyst component 42.2 g of n-BuCl (0.45 mole) and 52 g of $Si(OEt)_4$ diluted in 100 ml of toluene were added, in 45 minutes and at a temperature of 60° C., to 10.95 g of Mg metal (0.45 gram atoms), and reacted for 6 hours at 60° C. Washings with cold hexane were carried out. The residual solid product was dried under vacuum at 50° C., thus obtaining 49.4 g of a solid dry product having the following centesimal composition: Mg=18.2%; Cl=31.2%; Si=0.42%.

12.35 g of such solid product were reacted at 60° C. for 24 hours with 169.8 g (1 mole) of $SiCl_4$ and 3 g (20 m-moles) of ethyl benzoate. After removal of $SiCl_4$ by filtration at 60° C., and after consecutive washings with hexane at 65° C., the residual solid product was twice treated with $TiCl_4$, using 200 ml thereof each time, at 135° C. and for 1 hour per treatment. Further washings with hexane at 65° C. were then carried out until the disappearance of the chlorine ion in the filtrate.

The dry solid product had the following centesimal composition: Ti=1.05%; Cl=66.75%: Mg=20.3%; Si=0.21%. The surface area was=302 m²/g; the porosity=0.27 ml/g.

(b) Polymerization of propylene

Operating under the same polymerization conditions as described in Example 1(b), 66 mg of a solid product prepared as in Example 5(a) were employed. 220 g of a polymer in the form of irregular and non-homogeneous flakes, with a yield of 318,000 g of polypropylene/g of Ti having a residue of the extraction with boiling heptane equal to 87% by weight, were thus obtained. The polymer was furthermore characterized by the following properties:

apparent (mean) density: 0.4 kg/l
intrinsic viscosity: 1.7 dl/g
melt-flow index: 5.2 g/10 minutes.

EXAMPLE 6

(a) Preparation of the catalyst component 32.5 g of the product (MgClOEt-flakes) prepared according to Example 3(a) were suspended in 200 ml of anhydrous hexane, the temperature was brought to 0° C. and anhydrous gaseous HCl was bubbled in at a rate of 14.1 Nl/hour for 2 hours altogether. After feeding of the HCl was stopped, the suspension was brought to a temperature of 60° C. for 1 hour. It was washed with hexane at room temperature until disappearance of the chlorine ion. The solid was dried under vacuum (20 mm Hg of residual pressure) at 30° C., whereupon 34.8 g of dry product were obtained, the analysis of which gave the following results: Mg=15.65%; Cl=50.55%; Si=0.07%.

14.2 g of the obtained solid product were reacted, for 24 hours at 60° C., with 340 g of $SiCl_4$ (2 moles) and 3 g of ethyl benzoate (20 m-moles). The reaction mass was filtered at 25° C. under removal of $SiCl_4$, the residual solid was repeatedly washed with cold hexane, then it was suspended in 200 ml of $TiCl_4$ and reacted at 120° C. for 2 hours. After hot filtering, a similar treatment was carried out.

After repeated washings with cold hexane, until disappearance of the chlorine ion, the solid product was dried under vacuum at 40° C. The analysis of the dry solid gave the following results: Ti=2.25%; Cl=66.45%; Mg=16.35%. Area=410 m²/g; porosity=0.185 ml/g.

(b) Polymerization of propylene

Operating according to Example 1(b), 60 mg of the catalytic component (1.35 mg of Ti) prepared as described in 6(a) were employed. 412 g of a polymer in flakes were obtained. The yield was equal to 305,000 g of polypropylene/g of Ti, and the residue of the extraction with boiling heptane was 89% by weight.

The polymer was characterized by the following properties:
intrinsic viscosity: 2.1 dl/g
melt-flow index: 2.5 g/10 min.

| Particle size distribution of the polymer: | |
|---|---|
| (micron) | (% by weight) |
| over 2000 | 1.2 |
| over 1000 | 11.1 |
| over 500 | 14. |
| over 177 | 44. |
| over 105 | 27.3 |
| over 53 | 1.7 |
| below 53 | 0.6 |
| apparent density | 0.515 kg/l |
| flow index | 16 seconds. |

EXAMPLE 7

(a) Preparation of the catalyst component 32.5 g of the product (MgClOEt-flakes) prepared according to the modalities of Example 4(a), were suspended in a solution containing 11.52 g of anhydrous ethyl alcohol (0.25 moles) in 150 ml of hexane. The suspension was brought to 0° C., whereupon anhydrous gaseous HCl was introduced at a rate of 14.1 Nl/hour, for 2 hours. After introduction of the hydrochloric acid was stopped, the suspension was heated for 1 hour to 60° C. The solid product was washed with cold hexane and successively dried at 30° C. under vacuum at a partial pressure of 20 mm Hg. 45.6 g of dry product having the following centesimal composition were thus obtained: Mg=11%; Cl=37.65%; Si=0.1%.

20.3 g of said solid product were reacted with 340 g of SiCl$_4$ (2 moles) and with 3 g of ethyl benzoate (20 m-moles) for 24 hours at 60° C. After this time period, SiCl$_4$ was removed by filtration at 60° C. and the residual solid product was repeatedly washed with hexane at 60° C.; it was then suspended in 200 ml of TiCl$_4$ and reacted for 2 hours at 130° C. After hot filtering, an analogous treatment was carried out, followed by washings with hexane at 65° C. After drying at 40° C. under vacuum, the analysis carried out on the product gave the following results: Ti=2.15%; Cl=63.4%; Mg=18.05%; Si=0.23%.

(b) Polymerization of propylene

Under the same polymerization conditions as described in Example 1(b), 58 mg of the catalyst component prepared as described under (a) hereof were employed. 400 g of a polymer in flakes, with a yield of 320,000 g of polypropylene/g of Ti, having a residue of the extraction with boiling heptane of 89.5% by weight, were obtained. The polymer also had the following characteristics:
intrinsic viscosity: 2.1 dl/g
melt-flow index: 2.2 g/10 min.

EXAMPLE 8

(a) Preparation of the catalyst component 65.3 g of the product (MgClOEt-flakes) prepared as described in Example 3(a) were suspended in 400 ml of hexane, the temperature was brought to 0° C., and gaseous HCl was introduced at a rate of 14.1 Nl/hour, for 4 hours. After the HCl feeding was terminated, the suspension was heated for 1 hour to 60° C. Washings with hexane at room temperature were carried out. After drying, effected as described in Example 6(a), 70.6 g of a solid dry product were obtained, the analysis of which gave the following results: Mg=15.85%; Cl=48.5%.

15.4 g of the product so prepared were reacted with 340 g of SiCl$_4$ (2 moles) and 4.05 g of ethyl benzoate (27 m-moles) for 2 hours at 25° C.; after which the mixture was heated for 18 hours at 60° C. After this treatment, the mass was filtered at 50° C. and the filtered product was repeatedly washed with heptane at 50° C. The residual solid was dried, suspended in TiCl$_4$ and reacted for 2 hours at 130° C. After hot filtering, the treatment with TiCl$_4$ was repeated. After washings with heptane at 80° C. and drying, the dry solid had the following composition: Ti=1.65%; Cl=66.15%; Mg=19.80%; Si=0.19%. The surface area was 288 m²/g and the porosity 0.27 ml/g.

(b) Polymerization of propylene 64 mg of the catalytic component, prepared as described under 8(a), were employed. The polymerization was conducted under the same conditions as in Example 1(b). 296 g of polymer in flakes, with a yield of 280,000 g of polypropylene/g of Ti, having a residue of the extraction with boiling heptane of 87% were obtained. The polymer was characterized by an intrinsic viscosity of 2.1 dl/g and by a melt-flow index of 2.5 g/10 minutes.

EXAMPLE 9

(a) Preparation of the catalyst component 12.2 g of Mg metal pre-activated as described in Example 1(a) were mixed with 104.5 g of Si(OEt)$_4$ at a temperature of 65° C. and in the presence of 0.2 ml of a solution consisting of 2 g of iodine dissolved in 10 ml of CH$_3$J. A solution consisting of 51 g of n-BuCl in 100 ml of hexane was introduced dropwise, simultaneously with gaseous HCl at a rate of 11.2 Nl/hour, at a temperature of 70° C. n-BuCl in hexane was dropped in for 1 hour, while hydrochloric acid was introduced for 6 hours altogether.

After having stopped the HCl flow, the suspension was left under stirring for 1 hour more at 70° C., after being diluted with 100 ml of hexane. At the conclusion, washings were effected with hexane at 50° C. After drying, 76.3 g of a solid dry product were recovered, the analysis of which gave the following results: Mg=14.5%; Cl=40.85%; Si=0.16%.

16.8 g of the solid product so obtained were reacted with a mixture of 340 g of SiCl$_4$ (2 moles) and 3 g of ethyl benzoate (20 m-moles), at a temperature of 60° C. for 24 hours. After filtration at 55° C., the solid residue was repeatedly washed with hexane at room temperature and then reacted with 110 ml of TiCl$_4$ at 118° C. for 2 hours. The mass was hot-filtered and a further amount of TiCl$_4$ was introduced and reacted for 2 hours at 130° C. After hot-filtering, the product was repeatedly washed with hexane at 65° C. The solid residue was dried and analyzed. Its composition was the following: Ti=2.2%; Cl=55.1%; Mg=22%; Si=0.21%.

(b) Polymerization of propylene 65 mg of the catalyst component prepared as described under (a) were employed to conduct the polymerization of propylene under the conditions of Example 1(b). 287 g of polymer, with a yield of 201,000 g of polypropylene/g of Ti, having a residue of the extraction with boiling heptane of 87% by weight were obtained. The polymer was characterized by an intrinsic viscosity of 1.4 dl/g and by a melt-flow index of 11.6 g/10 min.

EXAMPLE 10

(a) Preparation of the catalyst component 13.1 g of the dry solid product prepared according to Example 1(a) were suspended in a solution containing 3 g of ethyl benzoate (20 m-moles) and 1.22 g of 2,6-dimethyl-phenol (10 m-moles) dissolved in 200 ml of anhydrous hexane. The suspension was brought to 60° C. and kept at that temperature for 2 hours. The solid was separated by filtration at room temperature and then washed twice with hexane (200 ml each time).

The solid product was treated with $TiCl_4$ under the same conditions as described in Example 1(a). The resulting solid product was repeatedly washed with hexane at 65° C. and successively dried under vacuum. Analysis thereof gave the following results: Ti=2.5%; Cl=63.25%; Mg=20%; Si=0.21%.

(b) Polymerization of propylene

Propylene was polymerized under the same conditions of Example 1(b), employing 61 mg of the catalyst component (1.525 mg of Ti) prepared as illustrated under (a) of this Example. At the conclusion of polymerization, 456 g of dry polymer in flakes were obtained; the yield was of 299,000 g of polypropylene/g of Ti, and the residue of the extraction with boiling heptane was equal to 91.5% by weight. The polymer exhibited, furthermore, the following characteristics:
intrinsic viscosity: 2 dl/g
melt-flow index: 2.4 g/10 min.

| Particle size distribution of the polymer: | |
|---|---|
| (micron) | (% by weight) |
| over 2000 | 0.1 |
| over 1000 | 0.2 |
| over 500 | 0.7 |
| over 177 | 90.2 |
| over 105 | 4.6 |
| over 53 | 3.1 |
| below 53 | 1.1 |
| apparent (mean) density | 0.51 kg/l |
| flow index | 16 seconds. |

(c) Polymerization in liquid propylene

Into a 150 liter autoclave, thermoregulated by means of water and steam, in the absence of air, the following was introduced: 36 g of the mixture of Al-butyls as in Example 1(b), diluted with 55.5 ml of hexane, in a liquid propylene flow equal to 15 kg, and successively—under stirring—10.9 g of methyl p-toluate dissolved in 52 ml of hexane along with a further 25 kg of liquid propylene (total amount of propylene introduced: 40 kg). The temperature was brought to 60° C. in 20 minutes, and 0.7 g of the catalyst component (17.5 mg of Ti), prepared as per (a) of this example, suspended in 200 ml of hexane, were introduced at said temperature, under pressure of hydrogen introduced in an amount of 100 Nl. The temperature rose rapidly to 70° C. (pressure=30 atmospheres) and was kept at that value for a total time of 3 hours. Polymerization was then stopped, the polymeric slurry was discharged into water and the unconverted monomer was removed by flashing. 5 kg of dry polymer in flakes were so obtained; the yield was 286,000 g of polypropylene/g of Ti, and the residue of the extraction with boiling heptane was 93.5% by weight.

The polymer exhibited the following characteristics:
intrinsic viscosity: 1.3 dl/g
melt-flow index: 18.7 g/10 min.

The analysis of the catalyst residues in the polymer revealed the presence of: Ti=3.5 ppm; Mg=26 ppm; Cl=105 ppm.

| Particle size distribution of the polymer: | |
|---|---|
| (micron) | (% by weight) |
| over 2000 | — |
| over 1000 | 0.1 |
| over 500 | 0.8 |
| over 177 | 90.9 |
| over 105 | 4.8 |
| over 53 | 1.9 |
| below 53 | 1.9 |
| apparent density | 0.48 kg/l |
| flow index | 16 seconds. |

EXAMPLE 11

(a) The preparation of the catalyst component is described in Example 2(a).

(b) Polymerization of ethylene in hexane 14.3 mg of the catalyst component, prepared as in Example 2(a), in suspension in 1000 ml of hexane containing 2 g of Al-tri-isobutyl were introduced, in a slight ethylene flow, into the same 2.5 liter autoclave described in Example 1(b). Temperature was rapidly brought to 85° C., while hydrogen was introduced at a partial pressure of 7.4 atmospheres, whereupon ethylene was introduced up to 6.6 atm.

Polymerization was conducted at a total pressure of 15 atmospheres, introducing ethylene at 85° C. for 4 hours. At the conclusion, 214 g of dry polymer in flakes were obtained; the yield was of 748,000 g of polyethylene/g of Ti; the E degree was equal to 7.8 g/10 min. and the N degree was equal to 81.6.

| Particle size distribution of the polymer | |
|---|---|
| (micron) | (% by weight) |
| over 2000 | 0.1 |
| over 1000 | 0.3 |
| over 500 | 30.1 |
| over 177 | 65.3 |
| over 105 | 2.1 |
| over 53 | 1.7 |
| below 53 | 0.4 |
| apparent density | 0.46 kg/l |
| flow index | 23 seconds. |

EXAMPLE 12

(a) Preparation of the catalyst component 14.2 g of the solid product having the following composition: Mg=15.65%; Cl=50.55%; Si=0.07%, prepared according to Example 6(a) were reacted with 3 g of ethyl benzoate in 60 cc of n-octane at 60° C. for 2 hours.

The suspension was added to 200 ml of TiCl$_4$ and reacted at 120° C. for 2 hours. After filtration, an analogous treatment was carried out. After repeated washings with heptane at 80° C. until the disappearance of the chlorine ions, a portion of the solid product was suspended in heptane, while the remaining portion was dried under vacuum at 40° C.

On analysis of the solid product, the following results were obtained: Ti=2.2%; Cl=60.8%; Si=0.13%; ethyl benzoate=9%. The surface area was equal to 410 m$^2$/g and the porosity to 0.190 ml/g.

(b) Polymerization of propylene

Example 1(b) was repeated with the exception that there was employed 0.6 ml of the suspension of the catalyst component prepared as per (a) and containing 1.72 mg of Ti.

430 g of polymer were obtained, corresponding to a yield of 250,000 g of polymer/g of Ti. The residue after extraction with boiling n-heptane was equal to 91.5%.

Granulometric distribution of the polymer (method ASTM D 1921-63) was as follows:

| micron | % by weight |
|---|---|
| over 2000 | 0.2 |
| over 1000 | 0.2 |
| over 500 | 55.6 |
| over 177 | 43.4 |
| over 105 | 0.3 |
| over 53 | 0.3 |
| Apparent density: 0.5 kg/l. | |

EXAMPLE 13

(a) Preparation of the catalyst component

Example 12 was repeated, with the exception that there were employed 2.8 g of benzoyl chloride, that were reacted for 1 hour at 60° C.

After reaction with TiCl$_4$, the dry product was subjected to analysis, with the following results: Ti=2.05%; Cl=62.2%; Si=0.04%; ethyl benzoate=10%.

(b) Polymerization of propylene

Example 12(b) was repeated using the component (a) of this Example. There were obtained 473 g of polymer, equal to a yield of 222,220 g of polymer/g of Ti, with a residue after extraction with boiling n-heptane of 93%. The intrinsic viscosity [η] was 2.5 dl/g. Granulometric distribution of the polymer:

| micron | % by weight |
|---|---|
| over 2000 | 0.9 |
| over 1000 | 1.8 |
| over 500 | 31.6 |
| over 177 | 64.6 |
| over 105 | 0.7 |
| over 53 | 0.3 |

Apparent density=0.53; flowability=16 seconds.

EXAMPLE 14

(a) Preparation of the catalyst component 32.5 g of compound ClMgOEt, prepared according to Example 3(a) were reacted with HCl under the same conditions as those of Example 6(a) with the exception that the reaction was carried out in the presence of 3 g of ethyl benzoate.

On analysis, the product obtained gave the following results: Mg=14.02%; Cl=38.98%; ethyl benzoate=17%.

The product so obtained was reacted with TiCl$_4$ under the same conditions as in Example 12, except that the reaction was conducted at 110° C.

On analysis of the dry product, the following was found: Ti=2.65%; Cl=59.8%; Si=0.1%; ethyl benzoate=9%.

(b) Polymerization of propylene

The polymerization was conducted under the same conditions as in Example 12(b) and 321 g of polymer were obtained, the yield being of 222,100 g of polymer/g of Ti.

EXAMPLE 15

(a) Preparation of the catalyst component 16.8 g of the solid product prepared according to Example 9(a) and containing Mg=14.5%, Cl=40.83%, Si=0.16%, were reacted with 3 g of ethyl benzoate in 60 cc of n-octane for 1 hour at 60° C. The suspension was added to 200 ml of TiCl$_4$ and reacted at 120° C. for 2 hours. After filtration, an analogous treatment was carried out. After repeated washings with heptane at 80° C., a part of the product was suspended in heptane, while the other part was dried under vacuum at 40° C.

On analysis of the dry product, the following results were obtained: Ti=2.2%; Cl=55.1%; Si=0.2%; ethyl benzoate=8%.

(b) Polymerization of propylene

Propylene was polymerized under the same conditions as in Example 12(b). There were obtained 287 g of polypropylene, corresponding to a yield of 201,000 g of polymer/g of Ti.

EXAMPLE 16

(a) Preparation of the catalyst component 37.7 g of the product prepared according to Example 7(a) and containing Mg=11%; Cl=37.65%; Si=0.1%, were reacted with 3 g of ethyl benzoate in 60 cc of n-octane for 1 hour at 60° C.

The resulting suspension was reacted with TiCl$_4$ under the same conditions as in Example 12. On analysis, the dry product gave the following results: Ti=1.8%; Cl=68.9%.

(b) Polymerization of propylene

Propylene was polymerized under the same conditions as in Example 12(b). 350 g of polymer were obtained, corresponding to a yield of 296,000 g of polymer/g of Ti. The residue after extraction with boiling n-heptane (isotactic polypropylene) was equal to 91.5%.

What we claim is:

1. Process for preparing a carrier for components of catalysts for the polymerization of olefins and having the formula $$X_nMg(OR)_{2-n}$$

in which n is about 2, R is an alkyl, aryl or cycloalkyl radical containing from 1 to 20 carbon atoms, and X is a halogen atom, which process comprises reacting a Mg compound having the formula $$X_nMgR_{2-n}$$

in which $0 \leq n < 2$, R is an alkyl, aryl or cycloalkyl radical containing from 1 to 20 carbon atoms and X is a halogen atom, with an ester of orthosilicic acid, in the presence of a halogenating substance.

2. The carrier prepared by the process of claim 1.

3. Components of catalysts for polymerizing olefins obtained by reaction of a titanium halide with a carrier comprising a Mg compound and obtained by the process of claim 1.

4. Components of catalysts for polymerizing olefins obtained by reaction of a titanium halide with a carrier comprising a Mg compound and obtained by the process of claim 1 in which, in the formula $X_nMg(OR)_{2-n}$, X is chlorine.

5. Components of catalysts for polymerizing olefins obtained by reaction of a titanium halide with a carrier comprising a Mg compound and obtained by the process of claim 1 in which, in the formula $X_nMg(OR)_{2-n}$, X is bromine.

6. The process of claim 1, in which, in the formula $X_nMg(OR)_{2-n}$, X is chlorine.

7. The process of claim 1, in which, in the formula $X_nMg(OR)_{2-n}$, X is bromine.

8. The process of claim 1, in which, in the formula $X_nMgR_{2-n}$, X is chlorine.

9. The process of claim 1, in which in the formula $X_nMgR_{2-n}$, X is bromine.

10. Components of catalysts for polymerizing olefins obtained by reaction of a titanium halide with a carrier comprising a Mg compound and obtained by the process of claim 1 in which, in the formula $X_nMgR_{2-n}$, X is chlorine.

11. Components of catalysts for polymerizing olefins obtained by reaction of a titanium halide with a carrier comprising a Mg compound and obtained by the process of claim 1 in which, in the formula $X_nMgR_{2-n}$, X is bromine.

* * * * *